BIAXIAL MAGNETIC FILM DATA PROCESSING DEVICE

Filed Feb. 12, 1962 4 Sheets-Sheet 1

INVENTOR.
MURRAY E. HALE
BY E MacKay Fraser
ATTORNEY

Sept. 8, 1964 M. E. HALE 3,148,360

BIAXIAL MAGNETIC FILM DATA PROCESSING DEVICE

Filed Feb. 12, 1962 4 Sheets-Sheet 2

INVENTOR.
MURRAY E. HALE
BY E MacKay Fraser
ATTORNEY

Sept. 8, 1964 M. E. HALE 3,148,360

BIAXIAL MAGNETIC FILM DATA PROCESSING DEVICE

Filed Feb. 12, 1962 4 Sheets-Sheet 3

INVENTOR
MURRAY E. HALE

BY E MacKay Fraser

ATTORNEY

BIAXIAL MAGNETIC FILM DATA PROCESSING DEVICE

Filed Feb. 12, 1962 4 Sheets-Sheet 4

INVENTOR
MURRAY E. HALE
BY E MacKay Fraser
ATTORNEY

United States Patent Office 3,148,360
Patented Sept. 8, 1964

3,148,360

BIAXIAL MAGNETIC FILM DATA PROCESSING DEVICE

Murray E. Hale, Atkinson, N.H., assignor to Laboratory for Electronics, Inc., Boston, Mass., a corporation of Delaware Filed Feb. 12, 1962, Ser. No. 172,606
12 Claims. (Cl. 340—174)

The present invention relates in general to new and novel data processing apparatus and in particular to data processing apparatus utilizing a magnetic medium having two easy directions of magnetization.

In the prior art, data has commonly been stored as a sequence of magnetic domains in a series of data tracks on magnetic drums and magnetic disks. These magnetic drums and disks, however, have been limited in their operations because of bulk, stringent tolerances on uniform rotational velocity and balance, and critical separation distances between recording heads and the magnetic recording surface. Furthermore, since the fringe field of the magnetic flux across the pole gap of a magnetic head is utilized in recording, a further decrease in data density is incurred (except in in-contact recording).

Accordingly it is the primary object of the present invention to provide new and novel apparatus for magnetically processing data.

It is a further object of the invention to provide new and novel apparatus for storing data in a series of data tracks which does not have any moving components.

It is another object of the invention to divide a magnetic storage medium into a series of data tracks by utilizing a magnetic medium having two easy directions of magnetization.

It is still another object of the invention to achieve high data packing density by utilizing the external field of a moving interdomain wall to write data into a magnetic storage medium.

In the present invention, a biaxial magnetic scanning medium, i.e. one having an easy direction of magnetization directed along one axis and a second easy direction of magnetization directed along a second axis angularly disposed thereto, is divided by the application of appropriate magnetic fields into a series of magnetic domains. These magnetic domains are usually in the form of strips and are magnetically oriented alternately along the two easy directions of magnetization. The scanning medium is progressively switched from one end to the other causing an interdomain wall to travel across the scanning medium. This interdomain wall consists of a series of segments alternately parallel to and angularly disposed with the magnetization vectors of the magnetic domains, with each of such segments moving in one of the domains in the scanning medium. A magnetic writing field, acting in conjunction with the interdomain wall segments parallel to the magnetization vectors of the magnetic domains, selectively reverses regions of a magnetic storage medium placed in close proximity to the scanning medium and having an easy direction of magnetization normal to the direction of travel of the interdomain wall. The data thus stored by these selective reversals can be read out by magneto-optic techniques or by a pickup coil when a second interdomain wall is propagated and the proper external fields are applied to the storage medium.

These and other novel features of the invention, together with further objects and advantages thereof, will become more apparent from the following detailed specification with reference to the accompanying drawings, in which:

FIG. 1 is a simplified illustration of a typical domain structure in a biaxial magnetic film.

FIG. 1*a* illustrates the external field of an inter-domain wall composed of alternating Bloch and Néel segments.

Figure 4:
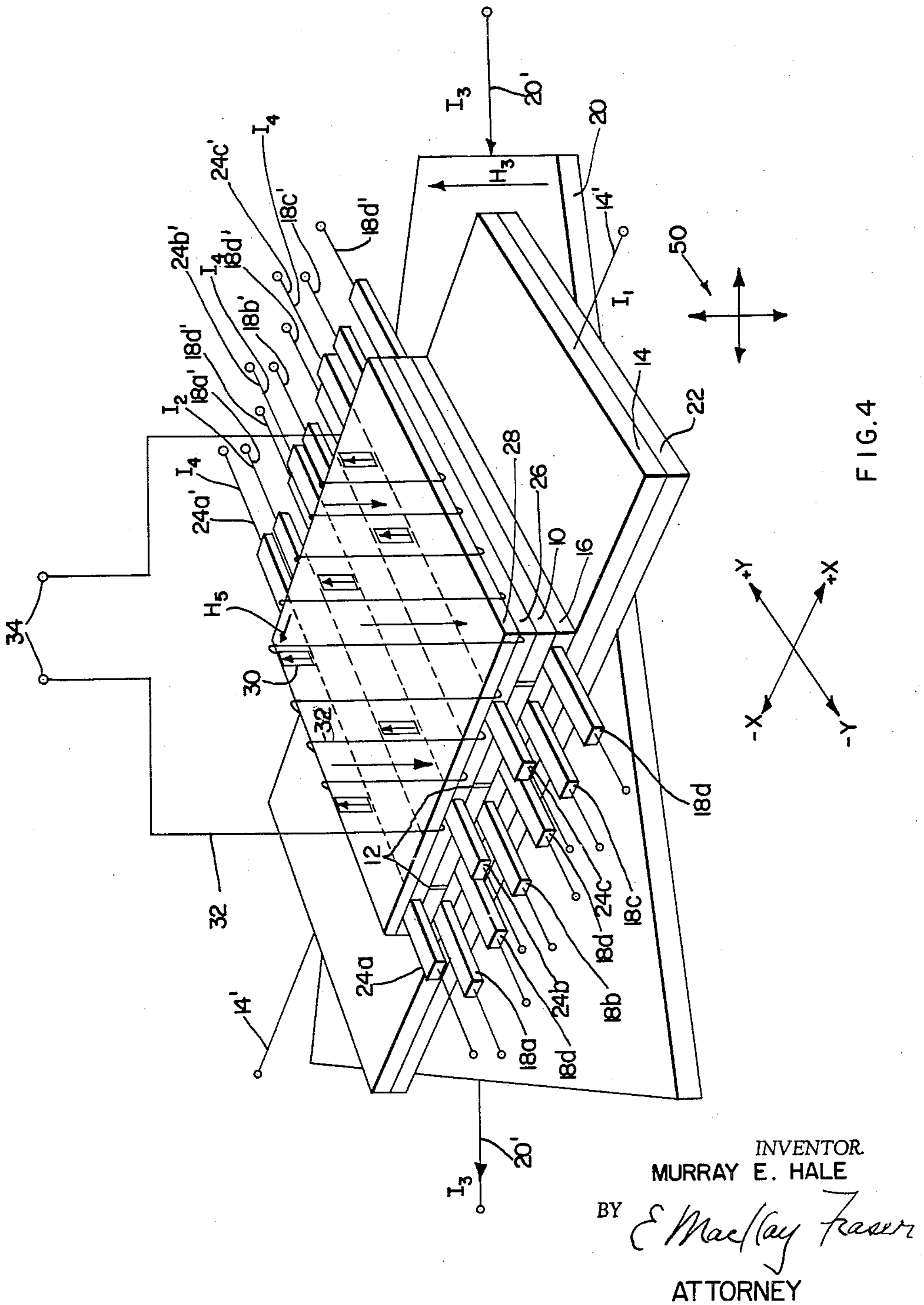
FIG. 4 is an illustration of a preferred embodiment of the invention.
Figure 5A:
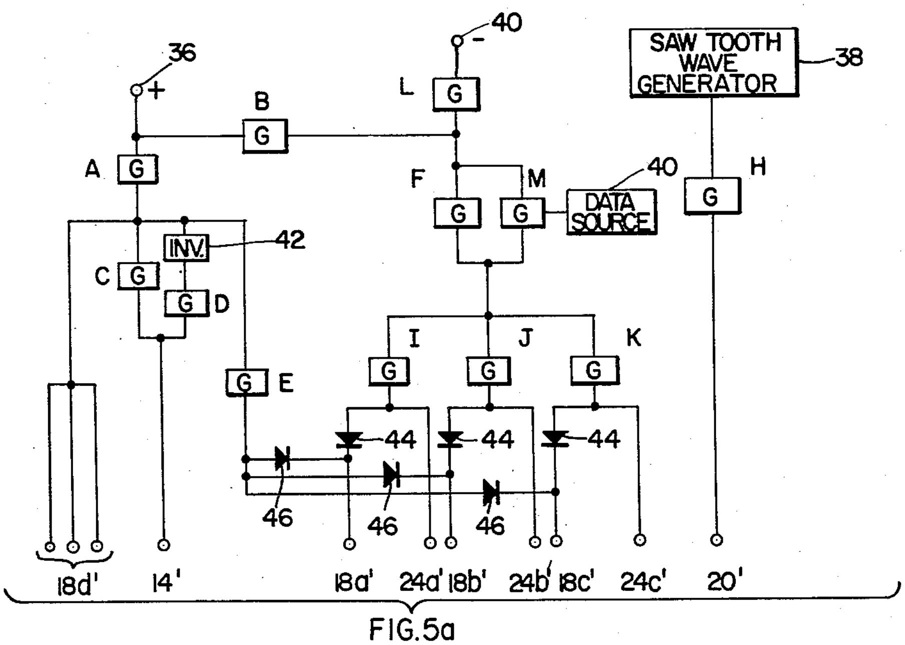

FIG. 5*a* schematically illustrates a control circuit for the embodiment in FIG. 4.

Figure 5B:
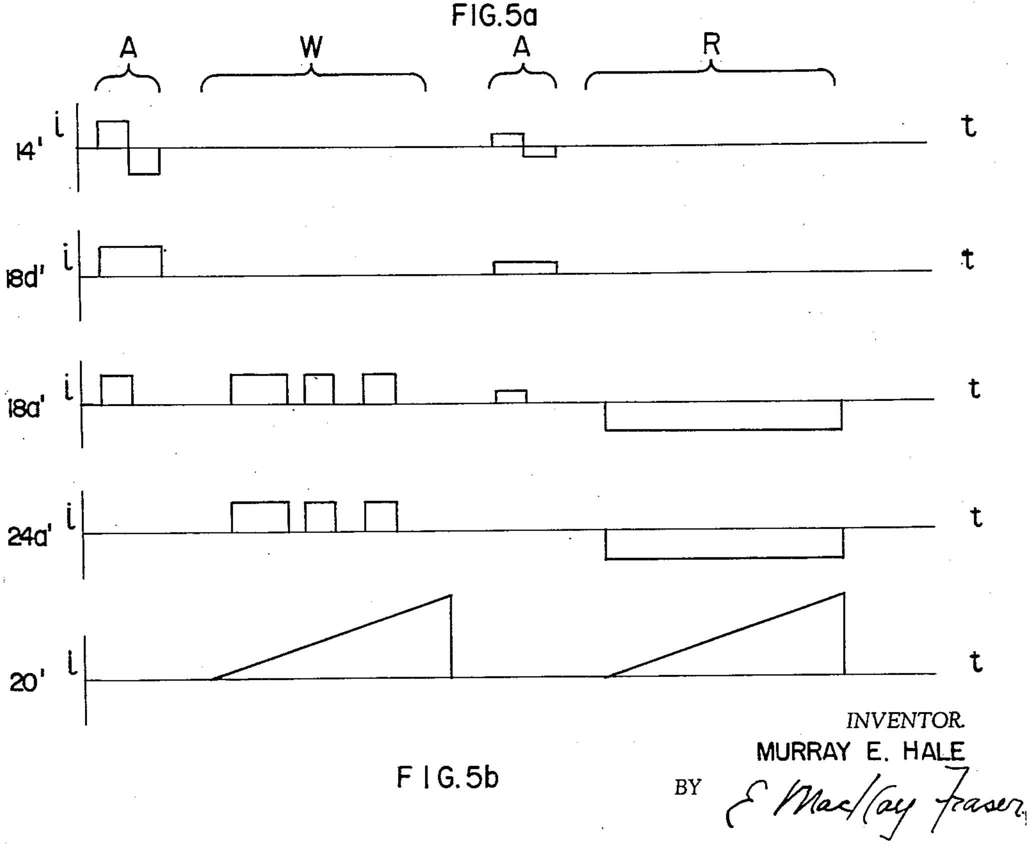

FIG. 5*b* graphically illustrates the current waveforms applied to the embodiment of FIG. 4 during one complete operating cycle.

In a typical uniaxial magnetic medium, i.e. one having a single easy direction of magnetization, the interdomain walls separating oppositely oriented magnetic domains are either Néel walls or Bloch walls, i.e. the magnetization vectors in the interdomain walls either rotate 180° in the plane of the magnetic medium or rotate 180° by rising up normal to the plane of the magnetic medium and falling down into the opposite orientation. In a biaxial magnetic medium, however, where interdomain walls can intersect one another, the interdomain wall structure and the magnetic domain pattern may assume various patterns, examples of which are shown by the configurations depicted in FIG. 1.

Figure 1:
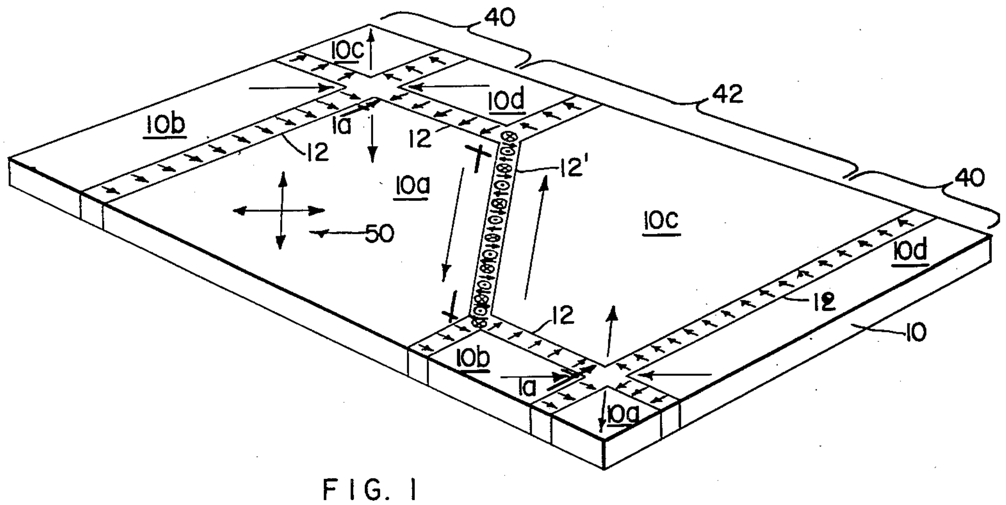
Figure 1A:
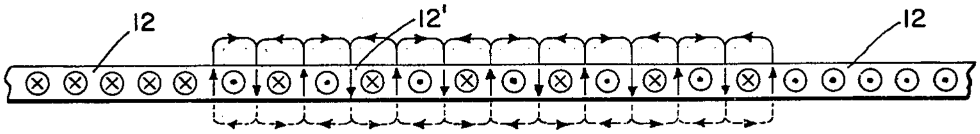

In FIG. 1, a magnetic medium 10 is shown having orthogonal easy directions of magnetization represented by the crossed arrows 50. The magnetic medium 10 may consist of a ferromagnetic material, such as NiFe, and is usually in the form of a thin film. The magnetic medium 10 is divided into magnetic domains 10*a*, *b*, *c*, *d* by a series of interdomain walls 12 and 12'; the magnetic orientation of the domains 10*a*, *b*, *c*, *d* is represented by the sense of the arrows shown therein. The two types of interdomain wall and magnetic domain configurations typical in a biaxial medium are shown in regions 40 and 42. In region 40, the magnetic orientations of the magnetic domains 10*a*, *b*, *c*, *d* are directed in what is called the "bucking mode." The magnetic orientations of adjacent domains, such as domains 10*b* and 10*a*, are orthogonal and the magnetic domains are separated by 90° Néel walls 12. At the intersection of the 90° Néel walls 12, the magnetization vectors of the magnetic domains 10*a*, *b*, *c*, *d* all curve away, hence the term "bucking mode." In region 42, the magnetic orientations of the magnetic domains 10*a*, *b*, *c*, *d* are directed in what is called the "circulation mode." It has been found that the interdomain walls separating oppositely oriented domains in biaxial media, such as the domain wall 12' separating domains 10*a* and 10*c*, are composed of alternating Bloch and Néel segments. The magnetization vectors of the magnetic domains 10*a*, *b*, *c*, *d*, in region 42, all circulate around the interdomain wall 12', hence the term "circulation mode." The interdomain wall 12', since it is composed of alternating Bloch and Néel segments, does not have a net external field, i.e. its external field reverses polarity in going from one Bloch segment to the next; this field configuration is shown in FIG. 1*a*. However, in the presence of an externally imposed magnetic field, the external fields of the Bloch segments of interdomain wall 12' are alternately reinforced and diminished in strength; the resultant field of the interdomain wall 12' is biased, therefore, toward the direction of the externally imposed magnetic field (and lies along the direction of the interdomain wall 12'). It is hypothesized that the "unbiased" field of the interdomain wall 12' is incapable of causing magnetic reorientation of a magnetic storage medium because the external fields of the Bloch segments are of opposite polarity and are equal in strength; when, however, these external fields are unequal in strength there exists net external field (i.e. a biased field) capable of causing reorientation in the direction of the field. Moreover, it has been found experimentally that the contribution of the "biased" external field of the interdomain wall 12′ to the externally imposed magnetic field is much stronger than the contribution given by the external field of the 90° Néel wall 12. The invention proposes to use the type of "biased" external magnetic field of the interdomain wall 12′ to aid in writing data into a magnetic storage medium.

Figure 2:
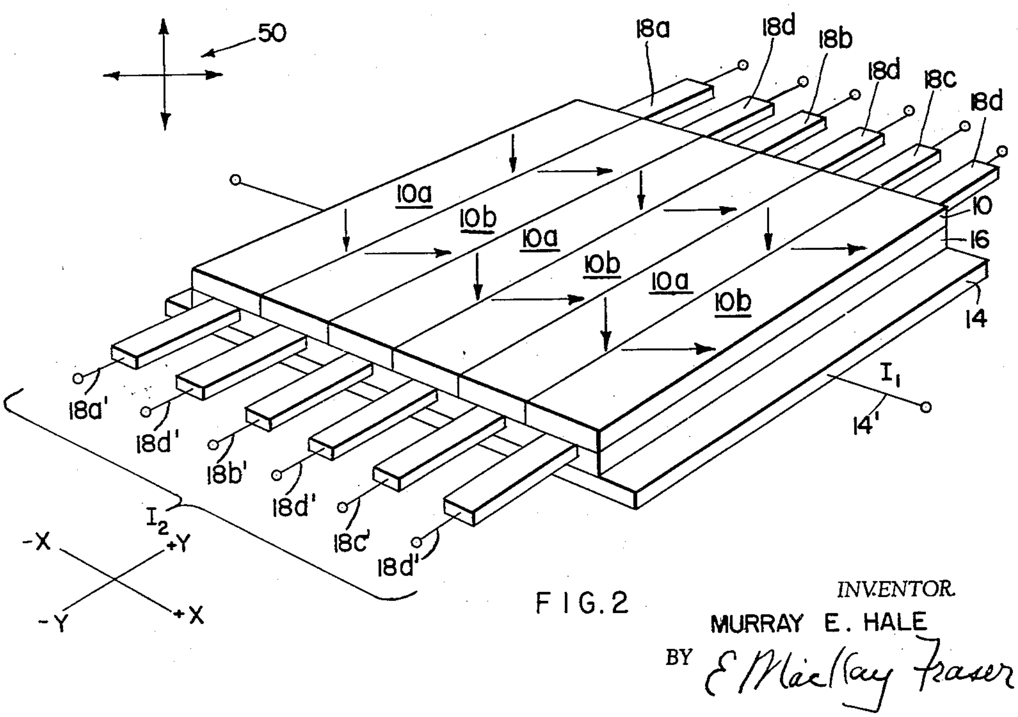
FIG. 2 illustrates apparatus for dividing a biaxial magnetic film into a series of orthogonally oriented domains.

In FIG. 2, a biaxial magnetic scanning medium 10, having easy directions of magnetization represented by the crossed arrows 50, is shown separated from a non-magnetic conducting medium 14 by an insulating medium 16. Underlying the scanning medium 10 is a series of non-magnetic conductors 18*a*, *b*, *c* and 18*d*, such conductors 18*a*, *b*, *c*, and 18*d* being insulated from medium 14 by insulating medium 16. To divide scanning medium 10 into a series of orthogonally oriented domains 10*a* and 10*b*, medium 14 and conductors 18*a*, *b*, *c* and 18*d* are simultaneously energized by currents $I_1$ and $I_2$ (generated by any known means) flowing through leads 14′ and leads 18*a*′, *b*′, *c*′ and 18*d*′ in the "+X" and "+Y" directions respectively. Currents $I_1$ and $I_2$ generate magnetic fields (not shown) in the "−Y" and "+X" directions at the surface of scanning medium 10 and the resultant field aligns the entire scanning medium 10 along the magnetic orientation shown in domains 10*a*. Current $I_1$ is then reversed (generating a field in the "+Y" direction) and, simultaneously, current $I_2$ in the alternate conductors 18*a*, *b*, *c* is stopped. The resultant field generates domains 10*b* having a magnetic orientation orthogonal to domains 10*a*, and divides the scanning medium 10 into the desired domain configuration. The intensity of $I_1$ is sufficiently low so as to be unable to switch the magnetization vectors of domains 10*a* by itself.

Figure 3:
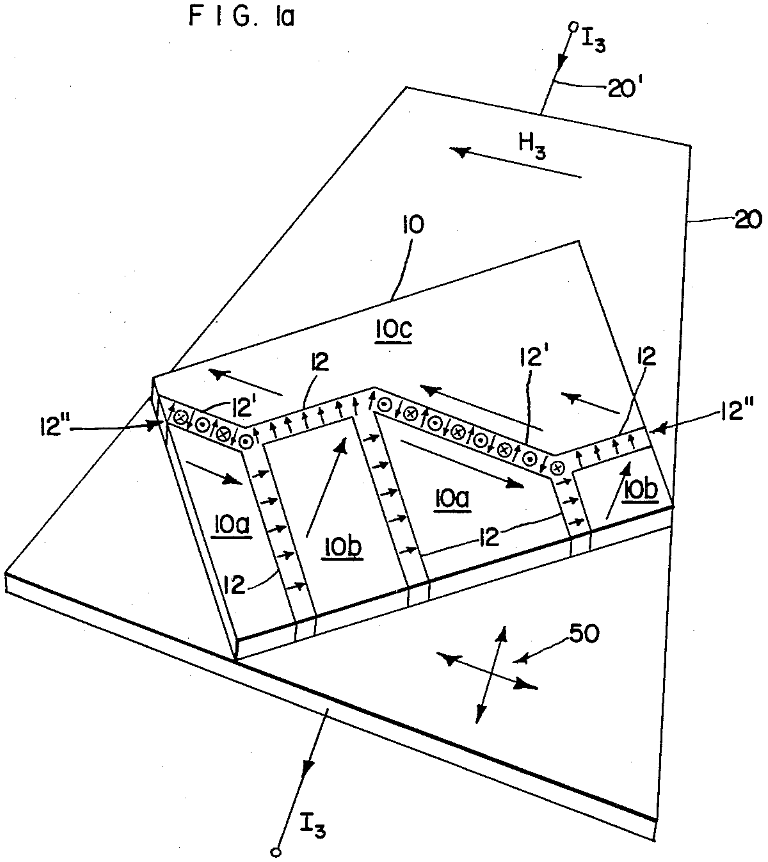
FIG. 3 illustrates the interdomain wall structure when a field gradient is applied to the biaxial magnetic film of FIG. 2.

In FIG. 3, a portion of scanning medium 10 (magnetically oriented by the apparatus of FIG. 2) is shown on a tapered non-magnetic conducting medium 20. A time-increasing current $I_3$ (generated by any known means) flows through leads 20′ and tapered medium 20 generating a time-increasing and spatially-decreasing magnetic field $H_3$. This driving field $H_3$ progressively reorients the magnetic orientation of scanning medium 10 thereby generating domain 10*c* and interdomain wall 12″ (composed of interdomain wall segments 12 and 12′) and propagating interdomain wall 12″ in a direction normal to the driving field $H_3$ (and along the field gradient). The magnetic structure of the interdomain wall 12″ results from the magnetic orientation of the domains 10*a*, *b*, *c*, as previously described in reference to FIG. 1. The vertical interdomain walls 12 are seen to divide scanning medium 10 into a series of data tracks; a writing field (further described in FIG. 4) causes magnetic reorientation in an adjacent magnetic storage medium (not shown) in the regions of the interdomain wall segments 12′ (which move down the scanning medium 10).

It should be noted that the interdomain wall 12″ will try to maintain itself along a line of equal field strength of the driving field $H_3$. Accordingly, it is likely that the interdomain wall 12″ will tend to bend up going from right to left and may even have a discontinuity at some point along its length; it may also tend to oscillate around some mean value of the driving field $H_3$. These variations will not, however, have any significant effect on the operation of the device.

In FIG. 4, a preferred embodiment of the present invention is illustrated. The conducting medium 14 is separated from tapered medium 20 by an insulating medium 22. On the conducting medium 14 are placed in succession: insulating medium 16, biaxial scanning medium 10, an insulating medium 26, and a uniaxial magnetic storage medium 28. Imbedded in insulating medium 16 are conductors 18*a*, *b*, *c* and 18*d*; above conductors 18*a*, *b*, *c*, a series of non-magnetic conductors 24*a*, *b*, *c* are imbedded in insulating medium 26. Insulating medium 26 is unnecessary if atomic diffusion between scanning medium 10 and storage medium 28 is not significant. The scanning and storage media 10 and 28 are initially oriented (by currents $I_1$ and $I_2$ previously described) along the magnetic orientation of domains 10*a* in FIG. 2. The scanning medium 10 is then divided into a series of orthogonally oriented domains (10*a* and 10*b* in FIG. 2) separated by interdomain walls 12 (shown in FIG. 3). The magnetic field necessary to effect this division is generated by currents $I_1$ and $I_2$ flowing through conducting medium 14 and conductors 18*d*; this field is not sufficiently strong, however, to change the magnetic orientation of the storage medium 28. Current $I_3$, flowing through medium 20, then generates field $H_3$ which causes an interdomain wall 12″ to propagate in scanning medium 10 (as described in FIG. 3).

Data is written, for example, into the left hand data track of the storage medium 28 by utilizing the "biased" external magnetic field of the interdomain wall segment 12′ in conjunction with data pulses through conductor 24*a* and conductor 18*a*. If conductors 24*a* and 18*a* are energized by currents $I_4$ and $I_2$ flowing through leads 24*a*′ and 18*a*′ in the "−Y" direction, a resultant writing field $H_5$ will appear in the "−X" direction at the surface of the storage medium 28. The writing field $H_5$ by itself is insufficient to reorient the direction of magnetization of any portion of the storage medium 28. However, the writing field $H_5$ in the immediate vicinity of the propagated interdomain wall 12″ in the scanning medium 10 is reinforced by the "biased" external magnetic field of the interdomain wall segment 12′ and is able to cause local reversal of the orientation of the storage medium 28, such reorientation being shown as domain 30. The "biased" external field of the interdomain wall segment 12′, as noted previously, lies along the direction of interdomain wall segment 12′ and is oriented toward the direction of the writing field $H_5$. During successive passages of the interdomain wall 12″, conductor pairs 24*b* and 18*b*, and subsequently 24*c* and 18*c*, are selectively energized resulting in a matrix of domains 30 arranged in a series of data tracks in the storage medium 28. Although conductor 24*a*, without conductor 18*a*, would provide a writing field $H_5$ sufficient to create domain 30 (in conjunction with the external field of interdomain wall segment 12′), conductor 18*a* is pulsed simultaneously in order to cause the cancellation of the magnetic fields of conductors 24*a* and 18*a* in scanning medium 10 and thereby prevent any undesirable accelerations of the interdomain wall segment 12′ in scanning medium 10. It should be noted that while it is preferable for the easy directions of magnetization of scanning medium 10 to be orthogonal, nonetheless, the appropriate physical conditions will occur to generate interdomain wall segment 12′ if the easy directions of magnetization are angularly disposed; proper readjustment should then be made in the strength and direction of magnetic fields $H_1$ through $H_4$.

During the readout cycle, a steady current is put through conductors 24*a* and 18*a* in the "+Y" direction, thereby generating a magnetic field (of opposite polarity to writing field $H_5$) in the "+X" direction. Such a field rotates the magnetization vectors of storage medium 28 slightly counterclockwise toward the "+X" direction and the magnetization vectors of the domain 30 slightly clockwise toward the "+X" direction. An interdomain wall 12″ is generated by magnetic field $H_3$ and the interdomain wall segment 12′ is propagated thereby in the "−Y" direction. The "biased" external field of the interdomain wall segment 12′ gives the magnetization vectors of the domain 30 an additional clockwise rotation toward the "+X" direction but gives the magnetization vectors of the storage medium 28 a clockwise rotation back toward the "−X" direction. A pickup coil 32 with output terminals 34 is wound around the storage medium 28 along the easy direction of magnetization thereof. The clockwise rotation of the magnetization vectors of the domain 30, as the interdomain wall segment 12′ passes by, causes a positive signal to appear at the output terminals 34 of the pick-up coil 32; the clockwise rotation of the magnetization vectors of the storage medium 28 causes, however, a negative signal to appear. In this manner, the presence of the domains 30 can be sensed, and the data represented thereby read out of the storage medium 28.

In FIG. 5*a*, a control circuit for the embodiment of FIG. 4 is shown; in FIG. 5*b*, the sequence of waveforms applied to the terminals in FIG. 4 during the alignment cycle (A), the writing cycle (W) and the reading cycle (R) is illustrated. Scanning medium 10 and storage medium 28 are initially aligned by a current from positive source 36 flowing into leads 18*d*′, 14′, and 18*a*′, *b*′, *c*′; gates A, C, and E are open while the remaining gates are closed. Diodes 44 prevent the current from going into leads 24*a*′, *b*′, *c*′ when gate E is open. Domains 10*a* and 10*b* are formed by closing gates C and E and opening gate D; a positive current is sent into leads 18*d*′ and a negative current is sent into leads 14′ because of the actuation of the inverter 42. During the entire writing cycle, gates A, L, and F are closed and gate B is open. The time-increasing current necessary to propagate interdomain wall 12″ is generated by a saw tooth wave generator 38. The fields necessary to create domains 30 are generated by the positive current source 36, which current is controlled by gate M, which, in turn, is controlled by data source 40. Gates I, J, and K are sequentially opened (in synchronization with gate H) to allow the data to be placed in the various data tracks. Diodes 46 isolate leads 18*a*′, *b*′, *c*′ from each other. During the entire reading cycle, gates A, B, and M are closed while gate L is open. A constant negative current (from negative current source 40) flows through gates L and F and is applied sequentially to leads 18*a*′ and 24*a*′, 18*b*′ and 24*b*′, 18*c*′ and 24*c*′ by gates I, J, and K. Gate H is synchronously controlled, as before, to generate and propagate interdomain wall 12″ to read the information, by means of coil 32, out of each data track in succession. Gates I, J, and K could obviously be opened selectively or in any sequence. It should be noted that the scanning medium 10 has to be realigned after each write and read cycle; this realignment should be done at reduced field intensity so as not to disturb any information in the storage medium 28. The control sequence of the gates A through L (except gate G) could be applied by a standard programmer.

An alternative method of reading data out of the storage medium is by the use of magneto-optic techniques. A line beam of polarized light is made to scan the data tracks in the storage medium. Upon reflection from the surface of the storage medium, the angle of polarization of the beam is rotated clockwise or counter-clockwise depending on the orientation of the magnetization vectors in the region of the storage medium being scanned. The intensity of the beam when it emerges from an analyzer will then fluctuate in accordance with the orientation of the magnetization vectors and hence be representative of the data stored.

The invention thus provides apparatus for processing data utilizing a biaxial magnetic medium. The data is written into data tracks by a writing field in conjunction with the "biased" external magnetic field of a moving interdomain wall. Since all of the magnetic, conducting, and insulating media can be deposited as films and the spatially restricted external field of an interdomain wall is used as a writing head, high data packing density is obtained without the disadvantages inherent in magnetic drums and disks. In addition, readout can be accomplished by a moving interdomain wall or by magneto-optic techniques, thus further permitting high data packing density.

Having described the invention, it will be apparent that numerous modifications and departures, as explained above, may now be made by those skilled in the art, all of which fall within the scope of the invention. Consequently the invention herein disclosed is to be construed as limited only by the spirit and scope of the appended claims.

What is claimed is:

1. Data processing apparatus comprising:

(*a*) a magnetic scanning medium having angularly disposed first and second easy directions of magnetization, (*b*) a magnetic storage medium in close proximity to said magnetic scanning medium, said magnetic storage medium having an easy direction of magnetization substantially parallel to said first easy direction of magnetization of said magnetic scanning medium, (*c*) orienting means for aligning the magnetization vectors of said magnetic scanning medium and said magnetic storage medium along said first easy direction of magnetization and for creating a sequence of angularly oriented magnetic domains in said magnetic scanning medium, said domains being magnetically oriented alternately along said first and second easy directions of magnetization, (*d*) driving means for establishing and propagating an interdomain wall in said magnetic scanning medium, said interdomain wall consisting of a series of segments alternately parallel to and angularly disposed with the magnetization vectors of said magnetic domains, and (*e*) writing means for selectively reversing the direction of magnetization of portions of said magnetic storage medium in accordance with the data to be stored, said writing means including the external magnetic field of said interdomain wall segments parallel to the magnetization vectors of said magnetic domains in said magnetic scanning medium.

2. The apparatus of claim 1 wherein said magnetic scanning medium and said magnetic storage medium consist of thin films of a ferromagnetic material.

3. The apparatus of claim 1 and in addition means for reading said data out of said magnetic storage medium.

4. The apparatus of claim 1 wherein said first and second easy directions of magnetization are orthogonally disposed.

5. Data processing apparatus comprising:

(*a*) a magnetic scanning film having orthogonally disposed first and second easy directions of magnetization, (*b*) a magnetic storage film in close proximity to said magnetic scanning film, said magnetic storage film having an easy direction of magnetization substantially parallel to said first easy direction of magnetization of said magnetic scanning film, (*c*) orienting means for aligning the magnetization vectors of said magnetic scanning film and said magnetic storage film along said first easy direction of magnetization and for creating a sequence of orthogonally oriented magnetic domains in said magnetic scanning film, said domains being magnetically oriented along said first and second easy directions of magnetization, (*d*) driving means for establishing and propagating an interdomain wall in said magnetic scanning film, said interdomain wall consisting of a series of segments alternately parallel to and angularly disposed with the magnetization vectors of said magnetic domains, and (*e*) writing means for selectively reversing the direction of magnetization of portions of said magnetic storage film in accordance with the data to be stored, said writing means including the external magnetic field of said interdomain wall segments parallel to the magnetization vectors of said magnetic domains in said magnetic scanning film.

6. The apparatus of claim 5 wherein said orienting means includes
(*a*) a non-magnetic conducting medium and
(*b*) a plurality of non-magnetic conductors angularly disposed with said conducting medium.

7. The apparatus of claim 5 wherein said writing means includes a plurality of non-magnetic conductors.

8. The apparatus of claim 5 wherein said driving means includes a tapered non-magnetic conducting medium.

9. The apparatus of claim 5 and in addition reading means for reading said data out of said magnetic storage film.

10. The apparatus of claim 9 wherein said reading means includes:
(*a*) a plurality of non-magnetic conductors and
(*b*) a coil adapted to produce an output signal in response to changes in orientation of the magnetization vectors in said magnetic storage film.

11. Data processing apparatus comprising:
(*a*) a tapered conducting film,
(*b*) means for generating a time-increasing current to establish in conjunction with said tapered film a time-increasing magnetic driving field having a field gradient substantially normal to the easy direction of magnetization of a magnetic storage film and adapted to establish and propagate an interdomain wall in a magnetic scanning film,
(*c*) a conducting film adapted, when conducting current, to establish a first magnetic field angularly disposed with said driving field,
(*d*) a first current generating means to establish an electric current in said conducting film,
(*e*) a first insulating film disposed between said tapered film and said conducting film,
(*f*) a magnetic scanning film having orthogonally disposed first and second easy directions of magnetization, said first direction of magnetization being substantially normal to said magnetic field gradient, (*g*) a second insulating film disposed between said conducting film and said scanning film,
(*h*) a first plurality of parallel conductors adapted, when conducting current, to generate a plurality of second magnetic fields normal to said first magnetic field, said conductors being separated from said conducting film by said second insulating film,
(*i*) a second current generating means to establish an electric current in said first plurality of conductors to generate said second magnetic fields, said first and second magnetic fields acting jointly to align the magnetization vectors of said scanning film and a magnetic storage film along said first easy direction of magnetization and to create a sequence of orthogonally oriented domains in said scanning film, said magnetic storage film having an easy direction of magnetization substantially parallel to said first easy direction of magnetization of said magnetic scanning film and adjacently disposed thereto,
(*j*) a second plurality of parallel conductors disposed between said scanning film and said storage film and parallel to alternate ones of said first plurality of conductors, and
(*k*) third current generating means to establish in conjunction with said second plurality of conductors a plurality of third magnetic fields parallel to said second magnetic fields, said third magnetic fields and alternate ones of said second magnetic fields acting in conjunction with the interdomain wall propagated in said scanning film to selectively reverse the direction of magnetization of said storage film in accordance with the data to be stored.

12. The apparatus of claim 11 and in addition a reading coil adapted to produce an output signal in response to changes in orientation of the magnetization vectors in said storage film.

No references cited.